United States Patent [19]

Cleland

[11] Patent Number: 4,850,515

[45] Date of Patent: Jul. 25, 1989

[54] PARTICULATE MATERIAL STORING AND DISPENSING HOPPER STRUCTURE

[76] Inventor: Robert K. Cleland, 11051 Via El Mercado, Los Alamitos, Calif. 90720

[21] Appl. No.: 224,731

[22] Filed: Jul. 27, 1988

[51] Int. Cl.[4] ........................ B67D 5/64; B65G 47/04

[52] U.S. Cl. .................................. 222/161; 222/164; 222/201; 222/227; 222/232; 222/129.4; 222/463; 198/533; 198/671; 366/196; 366/219

[58] Field of Search ............... 222/227, 228, 231, 232, 222/233, 201, 199, 161, 164, 463, 129.1, 129.4, 413; 366/196, 219; 198/533, 671; 221/188, 189

[56] References Cited

U.S. PATENT DOCUMENTS

| | | | |
|---|---|---|---|
| 1,398,790 | 11/1921 | Ogur | 222/164 X |
| 3,013,701 | 12/1961 | Joschko | 222/227 |
| 3,186,602 | 6/1965 | Ricciardi | 366/196 X |
| 3,203,599 | 8/1965 | Renner | 198/533 X |
| 4,488,664 | 12/1984 | Cleland | 222/413 X |
| 4,790,457 | 12/1988 | Morse et al. | 222/232 X |

FOREIGN PATENT DOCUMENTS

| | | | |
|---|---|---|---|
| 86501 | 7/1985 | Fed. Rep. of Germany | 222/164 |
| 577254 | 5/1946 | United Kingdom | 222/161 |

*Primary Examiner*—Joseph J. Rolla
*Assistant Examiner*—Gregory L. Huson
*Attorney, Agent, or Firm*—George A. Maxwell

[57] ABSTRACT

An elongate, horizontally upwardly opening particulate material storing receptacle with vertical front and end walls, upwardly projecting side walls, a longitudinally extending bottom wall, a material discharge opening at the front end of the receptacle, an elongate auger extending longitudinally within the receptacle from the rear wall to the discharge opening, a driven shaft on the auger and projecting rearwardly from the receptacle; and, a drive motor unit drivingly coupled with the driven shaft, the improvements comprise: mounting structure pivotally supporting the upper rear end of the receptacle about a horizontal transverse turning axis spaced vertically from the axis of the shaft, a cam plate with circumferentially spaced, rearwardly disposed lobes and recesses positioned rearward of the receptacle and carried by the shaft; and, a forwardly disposed reaction pose mounted rearward of the plate and in reacting driving engagement therewith to sequentially pivot the receptacle about the turning axis when the shaft rotates. The improvements further include an elongate material engaging bar with front and rear ends positioned within the receptacle above the auger, mounting structure pivotally mounting the rear end of the bar within the receptacle about a horizontal transverse pivot axis; and, a drive finger at the front end of the bar engaging the auger to pivot the bar vertically upwardly and downwardly about the pivot axis when the auger rotates.

10 Claims, 2 Drawing Sheets

Fig. 1.
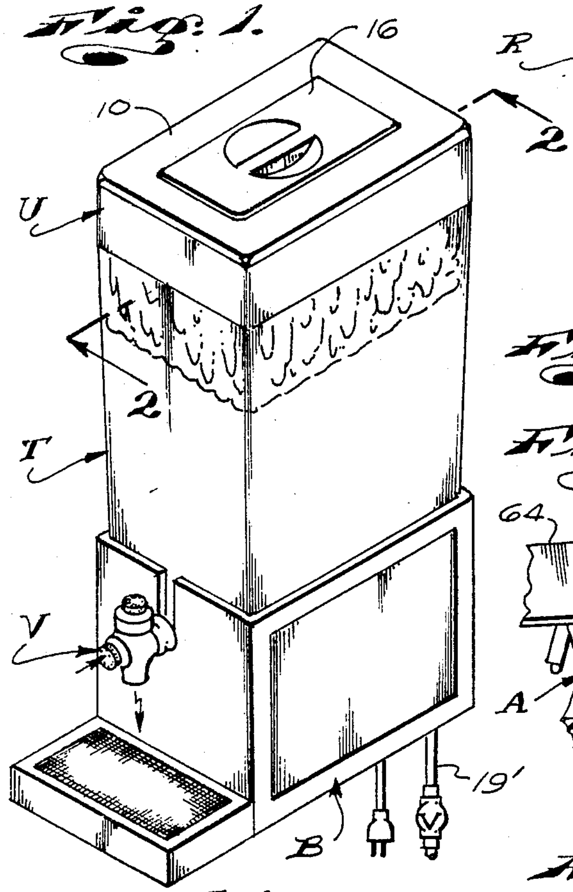
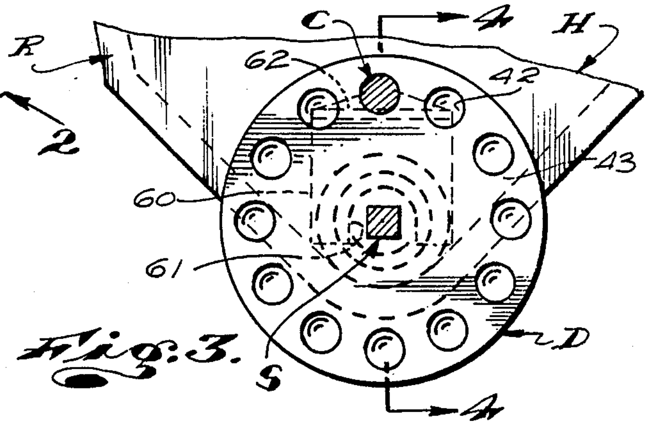
Fig. 3.
Fig. 4.
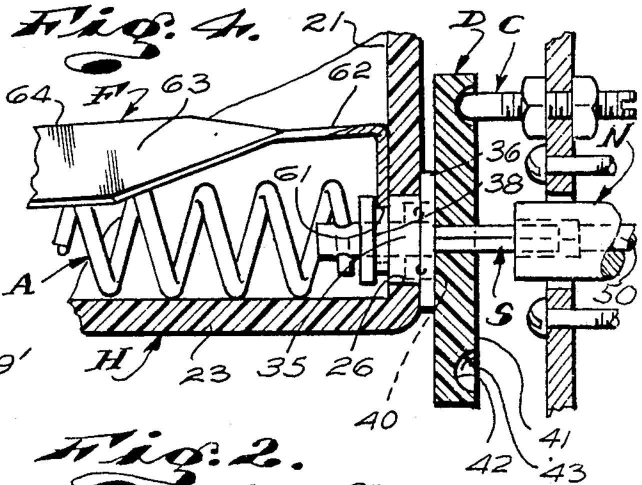
Fig. 2.
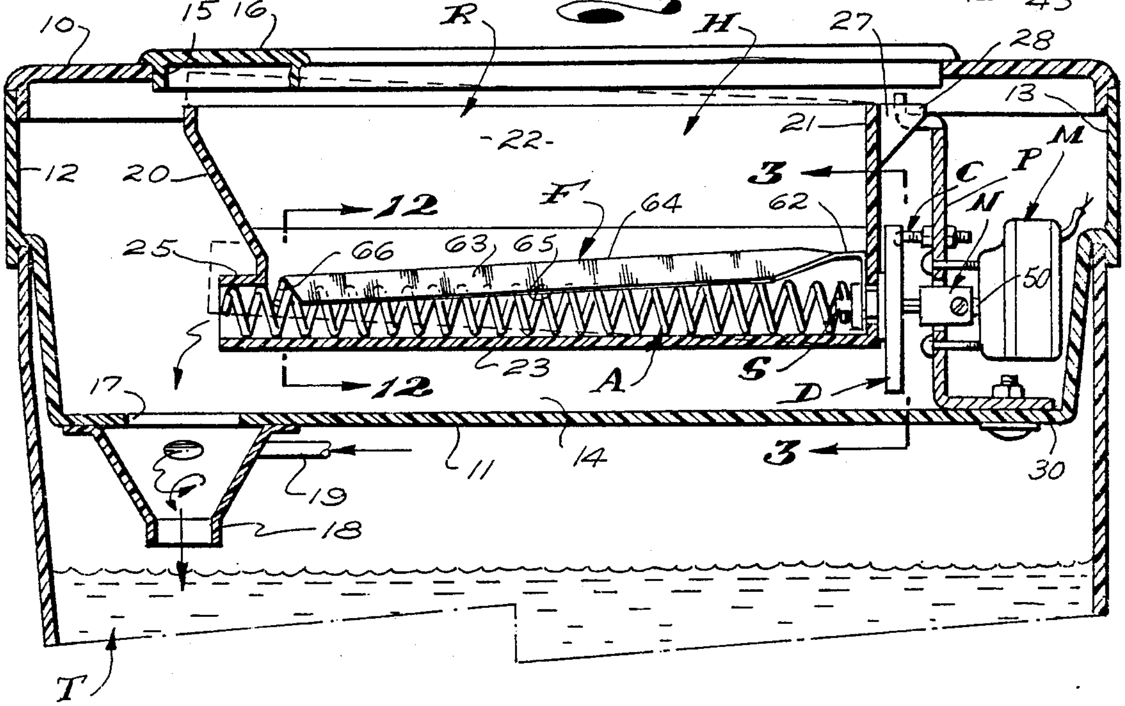

PARTICULATE MATERIAL STORING AND DISPENSING HOPPER STRUCTURE

PRIOR ART

The most pertinent prior art that I am aware of is U.S. Pat. No. 4,488,664 issued to Robert K. Cleland on December 18, 1984 and entitled "BEVERAGE DISPENSING MACHINE." All other prior art patents and unpatented prior art structures of which I am aware or which I might be charged with present knowledge of and which include particulate material storing and dispensing hopper structures with auger-type material transporting means do not teach structure which is similar to that structure which embodies the improvements which are the subject matter of the present invention.

This invention has to do with an improved material storage and dispensing hopper structure and is particularly concerned with a hopper structure for storing and dispensing metered volumes of particulate beverage concentrate within a related beverage dispensing machine.

BACKGROUND OF THE INVENTION

In the art of making and commercially dispensing beverages, such as lemonade and other non-carbonated fruit-flavored beverages, the art has long provided commercial beverage dispensing machines that include upwardly opening tanks into which water and beverage concentrates are delivered (in predetermined proportions) to mix and establish the beverage to be dispensed.

The beverage supply tanks in such machines are provided with valve controlled beverage dispensing mechanisms to intermittently dispense serving portions of the beverage into drinking vessels, such as drinking glasses or paper cups.

Beverage dispensing machines of the class here concerned with and noted above commonly include refrigeration means to maintain the beverages in the tanks cool; liquid circulating means to prevent separation of the ingredients of the beverages within the tanks; and, beverage supply monitoring means with related controls that sense the level of the supply of beverage in the tanks and that operate to intermittently deliver metered volumes of water and beverage concentrates into the tanks to maintain substantially full and constant supplies of beverage therein.

In the art here concerned with, the manufacturers and suppliers of beverage concentrate provide liquid concentrates in the form of heavy syrups and provide dry powder type particulate concentrates. Due to the distinct physical characteristics of liquid and particulate beverage concentrates, the art provides two distinct classes of beverage dispensing machines; that is, the art provides one class of machine specially designed and constructed to handle and use liquid concentrates and another or second class of machine that is specially designed and constructed to handle and use particulate concentrates. My present invention is particularly concerned with the last or second noted class of machine.

Beverage dispensing machines for handling and using particulate concentrate are characterized by the provision or inclusion of particulate concentrate storing and dispensing hopper structures. The hopper structures are positioned above the beverage supply tanks of their related machines. The hopper structures in such machines receive and hold supplies of particulate concentrate and are operated to intermittently dispense metered volumes of the concentrates into the tanks with which they are related. The concentrates delivered into the tanks combine with and dissolve in metered volumes of water delivered into the tanks by means of suitable water supply means that are included within the machines and to thereby establish and maintain desired supplies of beverages in the tanks.

To the best of my knowledge and belief, the most effective and serviceable form of hopper structure for such machines is an elongate, upwardly opening trough-like container or receptacle with upwardly and outwardly divergent side walls, substantially vertical front and rear end walls, a central longitudinally extending upwardly disposed concave bottom wall and a material dispensing opening at or close to the junction of the front and bottom walls. That form of hopper receptacle next includes an elongate Archimedes screw-type auger that extends longitudinally of the bottom wall. The auger is intermittently rotated by means of an electric drive motor unit and functions to move or transport the particulate material in the receptacle longitudinally forward to and thence through and from the discharge opening, as circumstances require.

While the above noted old and basic form of hopper structure is generally effective to move and dispense fresh and dry supplies of particulate beverage concentrate, it often fails to effectively move and dispense such concentrates that have absorbed sufficient moisture and/or have been warmed sufficiently to make the particles of the material tacky or sticky.

Particulate beverage concentrates of the nature here concerned with are normally heavily ladened with sugar, and are highly hydroscopic in nature. As a result of the foregoing, when such particulate beverage concentrates are stored in the hopper structures of beverage dispensing machines, they ordinarily absorb moisture at an undesirably rapid rate and soon become so tacky that adjacent particles of the materials stick together to establish a substantially non-fluid mass of material. When the materials become stuck together in the manner noted above, they fail to feed properly into engagement with the augers provided to transport them and the augers are incapable of transporting the materials as required. When the foregoing occurs, it is necessary and common practice for those who operate beverage dispensing machines to repeatedly open the machines or otherwise gain access to the hopper structures and, with a spoon or other hand tool, dig, push, stir and otherwise manually move the concentrates about, within the hoppers, to free the particles and thereby cause the materials to flow as required.

As a result of the above-noted tendency for particulate beverage concentrates to become tacky and non-fluid, the use of that form of beverage concentrates and the use of those beverage dispensing machines constructed to handle and use them have met with considerable resistance, in spite of the fact that the manufacturers and distributors of beverage concentrates, for a number of important and practical reasons, prefer to make and distribute dry powder-type particulate concentrates.

In the art of material handling and transporting, it has long been common practice to prevent particulate materials from bridging, compacting and otherwise "hanging up" in structures provided to contain them by vibrating or striking the containing structures to cause the materials to release from the surfaces thereof and/or to mix, stir or otherwise move the materials about within their containing structures to maintain them in a fluid state. Those means that have been used to attain the above-noted ends are well-known to those familiar with the art of material handling and include, for example, power-driven transducers and/or vibrators related to the containing structures to cause them to vibrate; power-driven hammer mechanisms and the like that strike the containing structures; power-driven material mixing rods, paddles and like mechanisms that work within the materials to maintain them fluid; and, various combinations of the above.

In practice, the various means or mechanisms that might be employed to maintain particulate materials fluid or that might induce such materials to flow when desired within related containing structures is often dictated by a multiplicity of special factors ranging from the size, shape and disposition of the containing structures to the specific physical characteristics of the materials being handled and worked upon. In addition to the foregoing, the nature of the means utilized to transport the materials and numerous environmental factors, such as the humidity and temperature of the environments in which the structures are used, are important factors which must be appropriately dealt with. As a result of the above, the effective operating parameters of the great majority of such means or mechanisms is often extremely narrow. While they are or might be effective in the specific environments of which they are specifically designed and constructed to work in, they are often times of little or no utility in substantially all other operating environments.

In the case of particulate beverage concentrates stored in and dispensed from trough-like receptacles with auger-type material transporting means, as provided in commercial beverage dispensing machines, a unique combination of operating conditions and environmental factors are encountered. Those conditions and/or factors have been found to render ordinary transducers, vibrators, hammering devices, and material mixing and/or stirring mechanisms such as might be effective to cause different materials to flow in a particular and desired manner in different material containing and transporting structures are of no particular value to cause particulate beverage concentrates to flow effectively within the above-noted form or class of beverage concentrate storing and dispensing hopper structures provided for beverage dispensing machines.

OBJECTS AND FEATURES OF MY INVENTION

It is an object of this invention to provide novel mechanisms and structure for inducing and enhancing the flow of particulate beverage concentrates in and from particulate beverage concentrate storing and dispensing hopper structures for beverage dispensing machines.

More particularly, it is an object of the invention to provide mechanisms and structure for enhancing the operation of hopper structures that are characterized by elongate, horizontally extending, upwardly opening box-like receptacles with vertical front and rear end walls, laterally outwardly and upwardly inclined side walls, and central longitudinally extending and upwardly disposed semi-circular bottom walls, and which further include concentrate discharge openings at their front end and elongate motor-driven augers extending longitudinally of the bottom walls from the rear walls to said discharge openings. Said novel mechanisms and structure function to induce and maintain the flow of particulate concentrate deposited in the receptacles downwardly and forwardly therein and into working engagement with the augers.

It is an object and feature of this invention to provide a hopper structure of the general character referred to above with novel hinge means that pivotally support the upper rear end of the receptacle about a horizontal transverse turning axis and to provide novel cam means at the rear end of the receptacle in spaced relationship below said transverse turning axis and operating to cyclically pivot the receptacle vertically upwardly and downwardly about said transverse turning axis to shake and maintain the particulate concentrate within the receptacle in motion and fluid.

It is another object and feature of the invention to provide a hopper structure of the general character referred to above with a novel, elongate drive bar within the receptacle between the side walls thereof and in vertical spaced substantially parallel relationship above the auger and shiftable vertically upwardly and downwardly in the particulate concentrate within the hopper to induce the flow of said concentrate downwardly, laterally and forwardly within the receptacle and into working engagement with the auger.

Yet another object and feature of the invention is to provide a hopper structure of the general character referred to above wherein the drive bar has a rear end resiliently pivotally mounted at the rear end of the receptacle and has a finger at its opposite forward end depending into driving engagement with the auger whereby said finger and the bar are intermittently driven vertically upwardly in the particulate concentrate in the receptacle by the auger when the auger is rotated.

Another object and feature of the invention is to provide a drive bar of the general character referred to above that is characterized by laterally inwardly and upwardly convergent, longitudinally extending flanges or walls converging at a longitudinally extending upper edge and which define laterally outwardly and upwardly disposed outer flank surfaces that afford easy upward penetration and movement of the bar in and through particulate concentrate in the receptacle when the bar is moved upwardly therein; and, that define laterally spaced, longitudinally extending, downwardly disposed cutting edges and laterally inwardly and downwardly disposed inner flank surfaces that engage and move particulate material contacted thereby laterally downwardly and inwardly into engagement with the auger when the bar moves downwardly.

The foregoing and other objects and features of the invention will be apparent and will be fully understood from the following detailed description of one preferred form and embodiment at the invention throughout which description reference is made to the accompanying drawings.

DESCRIPTION OF THE DRAWINGS

FIG. 1 is an isometric view of a beverage dispensing machine embodying the invention;

FIG. 2 is an elongate sectional view of a portion of the machine taken as indicated by line 2—2 on FIG. 1;

FIG. 3 is an enlarged view taken as indicated by line 3—3 on FIG. 2;

FIG. 4 is a sectional view taken as indicated by line 4—4 on FIG. 3;

DETAILED DESCRIPTION OF THE INVENTION

Figures 5, 6, 7, 8, 9, 10, 11, 12, 13, 14:
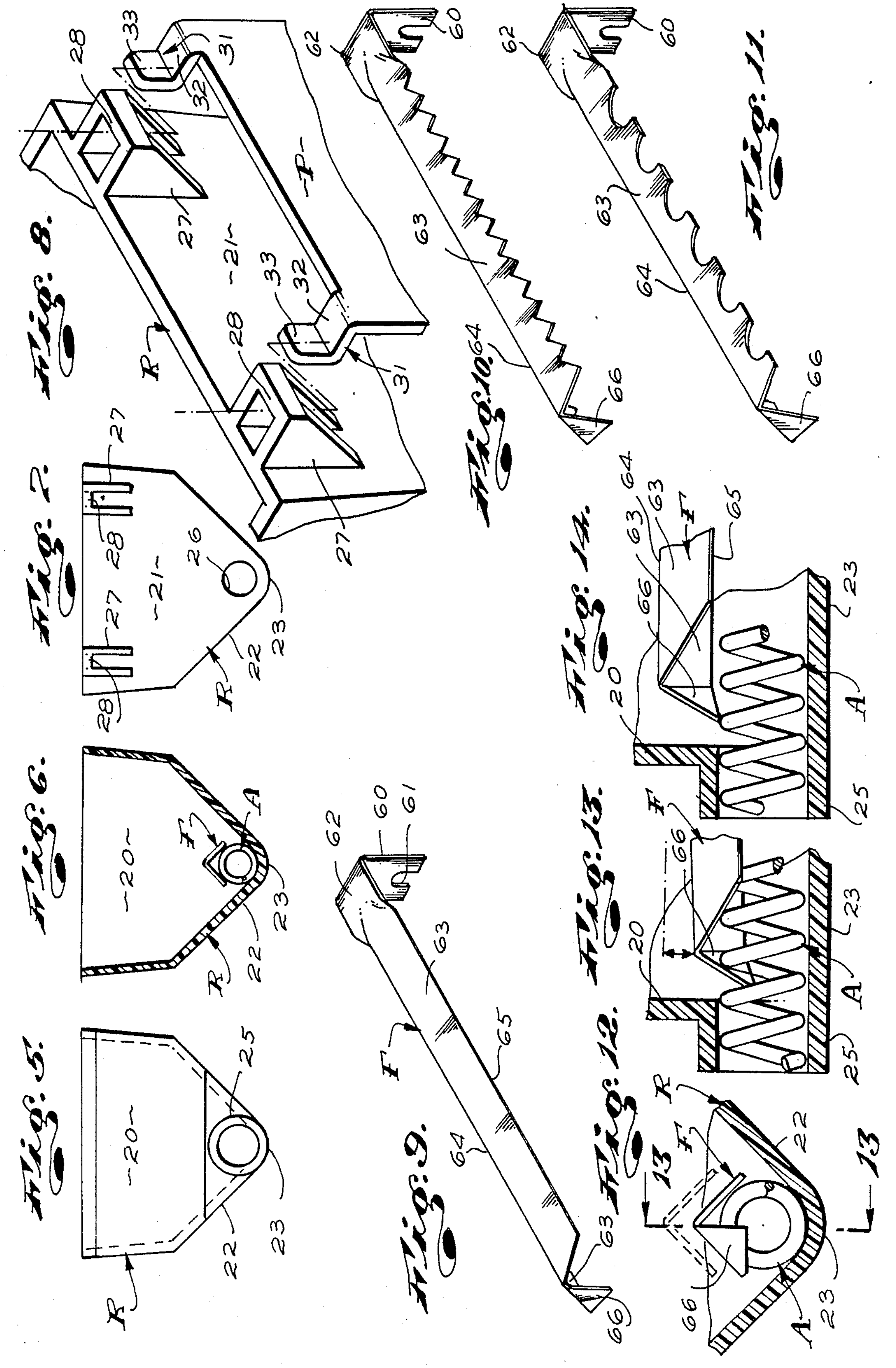
FIG. 5 is a front end view of the receptacle.
FIG. 6 is a transverse sectional view of the receptacle.
FIG. 7 is a rear end view of the receptacle.
FIG. 8 is an enlarged, exploded isometric view of the hinge means.
FIG. 9 is an isometric view of the drive bar.
FIGS. 10 and 11 show modified forms of drive bars.
FIG. 12 is an enlarged sectional view taken as indicated by line 12—12 on FIG. 2.
FIG. 13 is a sectional view taken as indicated by line 13—13 on FIG. 10.
FIG. 14 is a view similar to FIG. 13 showing parts in another position.

In FIG. 1 of the drawings, I have shown a typical commercial beverage dispensing machine such as is commonly used in restaurants, cafeterias and the like. Machine includes a box-like base unit B, an upwardly opening (transparent) beverage supply tank T mounted on top of and projecting upwardly from the base, a manually operable dispensing valve V suitably connected with the bottom of the tank and projecting forwardly from the upper front portion of the base, a drip tray projecting forwardly from the lower portion of the base in spaced relationship below the valve, and a box-like beverage supply unit U positioned atop and closing the tank. The unit U has top, bottom, front, rear and side walls 10, 11, 12, 13 and 14. The top wall 10 has an access opening 15 normally closed by a plate-like cover 16. The bottom wall 11 has a vertical passage or opening 17 in its forward end portion through which particulate beverage concentrate, dispensed within the unit U above that opening, is free to fall. The opening 17 communicates with a funnel-like mixing device 18 fixed to and depending from the bottom wall 11 and into which water, flowing from a water delivery line 19, is delivered. The concentrate and water delivered into the device 18 mix therein to make new beverage. The beverage made in the device 18 drains therefrom into the tank T.

Within the unit U is a particulate beverage concentrate hopper structure in which a supply of concentrate is stored and from which that concentrate, upon demand, is dispensed and is let to drop downwardly through the opening 17 into the device 18.

In accordance with common practice, in addition to the hopper structure H, the unit U can accommodate appropriate water delivery means parts such as a pressure regulator and an electrically operated on and off valve connected in series with the line 19 extending to the mixing device and with a water service line 19'. The unit U can further accommodate suitable means for monitoring the supply of concentrate in the hopper structure; means to monitor the liquid level in the supply tank T; and, both manual and automatic control means to control desired and effective operation of the means which are within the unit U and as circumstances require. In addition to the various means within or directly related to the unit U, the base B of the machine can accommodate refrigeration and liquid circulating means to maintain beverage in the tank T at a desired temperature and to maintain the beverage circulating within the tank for aesthetic or display purposes and to maintain solids of the beverage in suspension.

Since the present invention is only concerned with the hopper structure H within the unit U, I have elected not to illustrate and unnecessarily burden this disclosure with illustration and detailed description of the above-noted other means that might be included and made a part of the beverage dispensing machine. For a disclosure of a beverage dispensing machine including all of the various means noted or suggested above, reference is made to my U.S. Pat. No. 4,488,664 in which a substantially fully equipped or complete beverage dispensing machine is disclosed.

Referring again to the hopper structure H, that structure includes an elongate horizontal upwardly opening trough-like receptacle R with front and rear end walls 20 and 21, laterally outwardly and upwardly inclined side walls 22, and a central longitudinally extending semi-circular-in-cross-section bottom wall 23. In the case illustrated, the front wall 20, while not flat, can be considered as and is the full equivalent of a flat vertical transversely extending wall. The rear wall 21 is shown as a flat vertical transversely extending wall. The laterally outwardly and upwardly inclined side walls 22 are shown as having lower portions that are inclined laterally outwardly and upwardly at an angle of about 45° and as having upper portions that are inclined laterally outwardly and upwardly at a noticeably lesser angle so as to impart the receptacle with desired volumetric capacity.

In addition to the foregoing, the hopper structure H is provided with a forwardly and rearwardly opening discharge tube 25 at its front wall 20. The tube 25 is concentric with the axis of the semi-circular bottom wall 23. The tube 25 might be replaced by a simple discharge opening in the wall 20 or by a vertical discharge opening at the front end of the bottom wall 23 without departing from the broader aspects and spirit of my invention.

The rear wall 21 of the receptacle R is formed with a lower bushing opening 26 that is concentric with the bottom wall 23. The wall 21 is further provided with hinge parts 27 at or adjacent to its upper edge. The hinge parts 27 consist of two laterally spaced, rearwardly projecting appertured protuberances, each of which defines a horizontal laterally extending pivot rod 28, as clearly shown in FIGS. 7 and 8 of the drawings.

In practice, the receptacle R is a unitary molded plastic part positioned within the unit U with its open top accessible through the opening 15 in the top wall 10 of the unit U.

The hopper structure H next includes a flat vertical transversely extending mounting plate or bracket P with a lower horizontal mounting flange 30 screw-fastened to the bottom wall 11 of the unit U so that the plate projects upwardly in the unit U rearward of the receptacle R. The plate P is formed with hinge parts 31 to engage the hinge parts 27 on the receptacle. The hinge parts 31 consist of two laterally spaced forwardly projecting support pads 32 formed interedly with and projecting forwardly from the upper edge of the plate P. The pads 32 underly and support the rods 28 of the parts 31. The pads 32 have vertically projecting retaining tabs 33 at their front ends. The tabs 33 project upwardly in front of and establish retaining engagement with the rods 28. The parts 31 establish underlying and forward hooked supporting and retaining engagement with the rods 28 of the parts 27 and can be called hook parts for the purpose of this disclosure.

The pair of related hook parts and rods 28 establish a hinge means that releasably pivotally supports the upper rear end of the receptacle R on an upper rear transversely extending horizontal turning axis.

The receptacle R that I provide next includes an elongate bushing 35 with front and rear ends engaged in and through the bushing opening 26 in the rear wall 21 of the receptacle. The bushing 35 is a cylindrical part with a central shaft-receiving opening and a recess concentric with that opening and in which a shaft-supporting anti-friction bearing is engaged. The bushing has a stop flange 36 at its rear end that engages the rear surface of the wall 21. The front end portion of the bushing that projects forwardly from the front surface of the rear wall 21 is formed with a snap ring groove 38 to releasably receive a retaining part that engages the front surface of the rear wall 21 and which cooperates with the flange 36 to hold the bushing captive in the opening 26.

The hopper structure H next includes an elongate horizontal Archimedes screw-type auger A with front and rear ends. The auger A is positioned within the lower portion of the receptacle R concentric with the bottom wall 23 and the tube 25. The auger is substantially coextensive with the bottom wall and tube. The front end of the auger terminates within and adjacent the front end of the tube and the rear end thereof terminates in the rear end portion of the receptacle. The auger has an elongate, central, rearwardly projection driven shaft S with a cylindrical front portion that projects rearwardly through the opening in the bushing, is rotatably supported by the bearing within the bushing, and has a polygonal (square) rear portion that projects freely rearwardly from the bushing and from the receptacle.

In the form of the invention illustrated, the auger is in the form of an elongate helically wound spring metal rod or wire and is substantially equal in radial cross-sectional extent with the radii of the bottom wall 23 and the tube 25. The auger is such that it normally establishes free running engagement with the bottom wall 23 and in the tube 25.

The shaft S is a separate metal part. The front end portion of the shaft has a transverse opening in and through which a radially inwardly formed rear end portion of the auger is slidably removably engaged to establish rotary driving coupled engagement between the auger and the shaft.

The rear polygonal portion of the driven shaft S has a front end portion on and about which a cam disc D (with a central polygonal opening) is slidably frictionally engaged. The disc D extends radially outward from the shaft S and has a flat front surface that is in sliding bearing engagement with a flat rear bearing surface 40 on the flange 36 of the bushing.

In the preferred carrying out of the invention, the disc D has a flat, radially extending, rearwardly disposed rear bearing surface 41 and a plurality of circumferentially spaced, rearwardly opening recesses 42. The surface 41 and recesses 42 cooperate to define a plurality of circumferentially spaced, rearwardly projecting cam lobes 43. That is, the material of the discs occurring between adjacent recesses 42 define rearwardly projecting cam lobes 43.

Establishing the plurality of rearwardly projecting cam lobes 43 by means of the noted recesses 42 in the disc D was adopted for reasons of convenience and economy. If desired, the lobes 43 might be established on the disc D in any one of a number of different ways and, in so doing, the form or shape of the lobes can be changed as desired. It is to be noted that the cam plate D is spaced a substantial distance below the horizontal transverse turning axis for the receptacle R defined by the above-noted hinge means.

The structure H next includes a reaction part in the form of a cam follower C carried by the plate P and engageable with the cam disc D. The follower is in the form of a simple reaction post that is carried by and projects forwardly from the plate to normally enter and establish stopped engagement in the bottom of one of the recesses 42 in the disc D. When thus engaged in a recess 42, the reaction post or follower stops rearward movement of the rear wall 21 of the receptacle and downward pivotal movement of the receptacle about the turning axis and to hold the receptacle cantilever-supported in a substantially horizontal normal or lower position, as shown in solid lines in FIG. 2 of the drawings. When the auger, driven shaft and disc assembly is rotated, the cam lobes 43 ride over the post, forcibly urging the lower rear end of the receptacle forward and pivoting the receptacle upwardly about its turning axis to an upper position as shown in dotted lines in FIG. 2 of the drawings.

Due to the substantial longitudinal extent of the receptacle R when its rear end is moved axially a short distance by the cam plate and reaction part, the front end of the receptacle pivots upwardly and downwardly a substantial and notably greater distance.

In practice, the number of recesses 42 and/or cam lobes 43 can be varied as desired or as circumstances require. In my reduction to practice of the invention, I have determined that twelve recesses and lobes is satisfactory. With twelve lobes and recesses, upon each rotation of the auger, the receptacle is pivoted up and down twelve times. That number of vertical movements of the receptacle for each revolution of the auger results in sufficiently rapid vertical movement of the receptacle to cause the mass of beverage concentrate in the receptacle to be intermittently cast upwardly and freely within the front portion of the receptacle without casting it out through the open top of the receptacle. Thus, when and if the concentrate tends to stick to the inside surfaces of the receptacle and to establish a single mass of material therein, the hopper is pivoted upwardly and downwardly at a rate that frees the concentrate from the surfaces of the receptacle, breaks up and frees the adjacent particles of the material, and allows or causes it to flow and move within the receptacle as desired.

It is highly important to note that the above-noted cyclical pivotal movement of the receptacle is such that the particulate material in the receptacle, while being intermittently cast upwardly in the receptacle, is also cast forwardly toward the forward discharge end of the receptacle where it tends to establish an orbital flow pattern that tends to free the particles of material and to cause it to flow downwardly and forwardly into engagement with the auger.

It is important to note that when the receptacle R is cyclically pivoted in a manner described above, the mass of particulate material is dropping within the receptacle as the receptacle moves upwardly. As a result of the noted cyclical countermovement of the receptacle and the material, the downwardly and laterally inwardly inclined inside surfaces of the side walls of the receptacle tend to urge and direct the material laterally inward toward the central vertical longitudinal plane of the receptacle where gravitational forces serve to move the fluid material downwardly.

In the form of the invention illustrated, the follower or reaction post C is a simple cylindrical part with a smooth spherical front end that engages the disc D and is fastened to the plate by a pair of nuts threadedly engaged with the rear end portion of the post and such that the fore and aft working position of the post can be adjusted and set as desired.

The structure R next includes a variable speed drive motor M mounted on the plate P, at the rear side thereof. The motor M preferably includes a reduction gear train and has a forwardly projecting output or drive shaft 50 that is concentric with a through-opening in the plate and with the driven shaft S.

The shafts S and 50 are rotatably drivingly coupled by means of a semi-universal coupling part N. The part N is an elongate, cylindrical part with front and rear ends. The rear end of the part N is slidably engaged on the shaft 50 and is screw-fastened thereto. The front end of the part N has a central polygonal opening in which the polygonal rear end portion of the driven shaft S is freely entered. Sufficient slop of working clearance is provided between the shaft S and the polygonal opening in the part N to allow for sufficient universal movement between the shaft S and the part N for free pivotal movement of the receptacle R. Though such a universal coupling structure appears to be extremely crude and/or primitive, it has proven to be quite effective and suitable for use in carrying out my invention.

While the above-noted cyclical vertical pivotal movement or shaking of the receptacle R has proven to be quite effective to maintain particulate beverage concentrate fluid and moving in the receptacle R, it has been found that as the particulate material becomes increasingly tacky and is caused to migrate or move forwardly and downwardly in the receptacle, it tends to become compacted centrally in the front end of the receptacle and to bridge over the auger.

As a result of the above and to prevent compacting and bridging of the particulate material above or over the auger, I provide a novel drive bar F within the receptacle R. The bar F is cyclically raised and lowered within the material in the receptacle to agitate and move the material, above the auger, and to drive that material downwardly and forwardly in the receptacle into working engagement with the auger. The bar F is an elongate substantially horizontally disposed part with front and rear ends. It extends longitudinally within the receptacle in substantial parallel vertical spaced relationship above the auger. The rear end of the bar has a vertically extending depending mounting flange 60 that establishes flat supported bearing engagement with the front surface of the rear wall of the receptacle. The lower end of the flange 60 is formed with a central axially and downwardly opening notch 61 that forms the lower end portion of the flange into a retaining clip or key for the bushing and that establishes sliding frictional engagement in the snap ring groove 38 in the bushing 35. The lower end of the flange 60 establishes stopped engagement with inside surfaces of the receptacle R to prevent turning of the flange and the bar within the receptacle and about the axis of the bushing and auger.

The bar F is preferably a unitary part formed of thin, flat spring metal stock and has a short, flat, horizontal axially extending rear spring portion 62 immediately forward of the flange 60. The remainder of the bar is V-shaped in cross-section and is characterized by a pair of elongate, longitudinally extending, laterally outwardly and downwardly inclined flanges or side walls 63. The upper longitudinal edges of the side walls 63 converge to define an elongate, upwardly disposed, central, upper working edge 64. The lower edges of the side walls 63 cooperate to define a pair of laterally spaced, parallel, downwardly and laterally outwardly disposed lower scraping or cutting edges 65. The side walls 63 have upwardly and laterally outwardly disposed outside flank surfaces and downwardly and laterally inwardly disposed inside flank surfaces.

The forward end of the bar F is formed with and carries an elongate forwardly and downwardly extending drive finger 66. The finger 66 projects into driving engagement with the auger A as clearly shown in FIGS. 10, 11 and 12 of the drawings. It will be apparent that when the auger is rotated, the finger 66 is engaged thereby and is intermittently and alternately driven vertically and released to move downwardly thereby. Upon vertical movement of the finger 66, the bar F is pivoted vertically upwardly about an axis defined by the rear spring or spring portion 62 thereof to an upper position where the spring portion is biased to drive the bar downwardly. Upon release or disengagement of the auger with the finger, the spring portion drives the bar downward to a lower position where its forward end establishes stopped engagement on and about the upper half of the auger. The bar F is driven slowly upwardly to its upper position and is driven rapidly downwardly to its lower position once upon each revolution of the auger.

When the bar F moves upwardly, its upper central edge 64 penetrates the material in the receptacle that occurs above it and the outer flank surfaces of the bar displace that material laterally outwardly toward the downwardly and inwardly inclined side walls of the receptacle R. When the bar moves downwardly, the lower cutting or scraping edges 65 of the bar bite into the material and the inside flank surfaces of the bar cooperate with the side walls of the receptacle to drive the material worked upon downwardly and laterally inwardly into engagement with the auger.

In practice, when the particulate material is sticky and tends to "cake", upward movement of the bar breaks up the caked material. Thereafter, upon downward movement of the bar, the outer lower edges thereof, in effect, scrape the material, to further break it up and put it into a sufficiently fluid state to assure necessary and desired movement thereof into working engagement with the auger.

Due to the fact that the front end of the bar swings a greater distance than the rear end portion thereof, when it is moved upwardly and downwardly, the bar effectively operates to keep the material worked upon advancing forward within the receptacle and about the auger.

It should be particularly noted that the auger is pitched and is rotated in a direction to move the particulate material in the receptacle forwardly within the receptacle through the discharge duct and thence into, through and from that duct.

In FIGS. 10 and 11 of the drawings, I have illustrated two modified forms of my new drive bars. In these forms of bars, the lower, longitudinally extending cutting edges are serrated and such that upon downward movement of those bars in their related bodies or masses of particulate material, their serrated edges bite into and scarify the material, breaking it up or reducing it in a desired manner.

Whether the cutting edges are serrated and the slope and extent of the serrations, if they are serrated, is dependent upon the physical characteristics of the particulate concentrates worked upon. There are some very fine, relatively dry concentrates that are best shaved by straight cutting edges while others are coarser and "stickier" and are best scarified and scraped by serrated cutting edges to reduce them.

The form of serrated edge shown in FIG. 10 is a compromise between the forms of edges shown in FIGS. 9 and 11 and is that form of edge that is being adopted in regular production embodiments of my invention.

It will be apparent that in the improved hopper structure that I have invented and which I have illustrated and described in the foregoing, a continuous and steady flow of particulate concentrate material within the structure is substantially assured and that those problems normally caused by the sticking-together and bridging of the particles of the materials worked upon is substantially eliminated.

In those hopper structures of the general character here concerned with that have been provided by the prior art, the drive motors have been constant speed motors. As a result, the flow rate and volume of material dispensed by those hopper structures is constant and is determined by the constant speed of rotation of the augers and by the diameter and pitch thereof. To change the rate and volume at which the material worked upon is dispensed, as is often required, augers of different pitch are made available and an auger of suitable pitch must be selected and put to use in the hopper structures each time a change in the rate and volume of material dispensed must be affected. This practice has proven to be quite unsatisfactory.

In carrying out my invention, the motor is a variable speed motor and is such that the rate at which the auger is rotated can be easily and effectively adjusted at any time to alter or adjust the rate and volume at which the particulate material worked upon is dispensed, without the need of putting the structure out of operation and without the need of exchanging parts and the like.

Having described only one typical and preferred form and embodiment of my invention, I do not wish to be limited to the specific details herein set forth but wish to reserve to myself any modifications and/or variations that might appear to those skilled in the art and which fall within the scope of the following claims.

Having described my invention, I claim:

1. Improvements in a particulate material storing and dispensing hopper structure comprising an elongate upwardly opening box-like receptacle with front and rear end walls, laterally spaced side walls, a bottom wall and a discharge opening at the front end portion thereof, an elongate auger extending longitudinally in the receptacle, a driven shaft on the auger and projecting rearwardly from within the receptacle and a drive motor unit with a drive shaft mounted rearward of the receptacle and a semi-universal coupling between the shafts, said improvements include mounting means pivotally supporting the rear end of the receptacle on a horizontal transversely extending turning axis spaced vertically from the axis of the shafts, a cam disc with a plurality of circumferentially spaced rearwardly disposed alternating cam lobes and recesses positioned rearwardly of the receptacle and in rotary driving engagement on the driven shaft and a forwardly disposed reaction post mounted rearward of the disc in driving relationship therewith to pivot the receptacle vertically upwardly and downwardly about said turning axis upon rotation of the disc.

2. The improvements in a particulate material storing and dispensing hopper structure set forth in claim 1 wherein the drive motor unit is a variable speed motor unit and is operable to vary the rate at which material is moved by the auger.

3. The improvements in a particulate material storing and dispensing hopper structure set forth in claim 1 which further include an elongate drive bar with front and rear ends extending longitudinally in the receptacle in spaced parallel relationship above the auger mounting means securing the rear end of the bar within the receptacle on a transverse pivot axis; and, a drive finger at the front end of the bar and projecting into driving engagement with the auger to be intermittently moved upwardly and released to move downwardly relative to the auger and to move the bar vertically between upper and lower positions in the receptacle when the auger rotates.

4. The improvements in a particulate material storing and dispensing hopper structure set forth in claim 3 wherein the bar has laterally inwardly and upwardly inclined side walls converging at a central upwardly disposed upper edge and each of which has a straight, downwardly disposed, longitudinally extending material cutting and scraping lower edge.

5. The improvements in a particulate material storing and dispensing hopper structure set forth in claim 3 wherein the bar has laterally inwardly and upwardly inclined side walls converging at a central upwardly disposed upper edge and each of which has a downwardly disposed, longitudinally extending serrated material cutting and scraping lower edge.

6. The improvements in a particulate material storing and dispensing hopper structure set forth in claim 3 wherein the bar has laterally inwardly and upwardly inclined side walls converging at a central upwardly disposed upper edge and each of which has a straight, downwardly disposed, longitudinally extending material cutting and scraping lower edge, each side wall of the bar has a laterally inwardly and downwardly disposed material engaging inner flank surface disposed substantially toward and directing material worked upon by its lower edge laterally inward toward the auger when the bar moves downwardly.

7. The improvements in a particulate material storing and dispensing hopper structure set forth in claim 3 wherein the bar has laterally inwardly and upwardly inclined side walls converging at a central upwardly disposed upper edge and each of which has a downwardly disposed, longitudinally extending serrated material cutting and scraping lower edge, each side wall of the bar has a laterally inwardly and downwardly disposed material engaging inner flank surface disposed substantially toward and directing material worked upon by its lower edge laterally inward toward the auger when the bar moves downwardly.

8. The improvements in a particulate material storing and dispensing hopper structure set forth in claim 3 wherein the bar has laterally inwardly and upwardly inclined side walls converging at a central upwardly disposed upper edge and each of which has a downwardly disposed, longitudinally extending material cutting and scraping lower edge, each side wall of the bar has a laterally inwardly and downwardly disposed material engaging inner flank surface disposed substantially toward and directing material worked upon by its lower edge laterally inward toward the auger when the bar moves downwardly, said walls of the receptacle are inclined laterally inwardly and downwardly, each side wall of the bar has a laterally outwardly and upwardly disposed material engaging outer flank surface directing material worked upon by said upper edge laterally outward toward the side walls of the receptacle when the bar moves upwardly.

9. The improvements in a particulate material storing and dispensing hopper structure set forth in claim 1 wherein said bottom wall of the receptacle is semi-circular in cross-section, said side walls of the receptacle extend laterally outwardly and upwardly from said bottom wall, the discharge opening is in the front end wall of the receptacle and is concentric with the bottom wall thereof, the front end of the auger extends into said opening.

10. The improvements in a particulate material storing and dispensing hopper structure set forth in claim 1 wherein said bottom wall of the receptacle is semi-circular in cross-section, said side walls of the receptacle extend laterally outwardly and upwardly from said bottom wall, the discharge opening is in the front end wall of the receptacle and is concentric with the bottom wall thereof, the front end of the auger extends into said opening; said drive motor unit is a variable speed motor unit and is operable to vary the rate at which material is moved by the auger.

* * * * *